(12) United States Patent
Hubel et al.

(10) Patent No.: US 6,796,658 B2
(45) Date of Patent: *Sep. 28, 2004

(54) CONFIGURATIONS FOR COLOR DISPLAYS BY THE USE OF LENTICULAR OPTICS

(75) Inventors: Paul M. Hubel, Mt. View, CA (US); Robert W. G. Hunt, Sallsbury (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/454,294

(22) Filed: Jun. 3, 2003

(65) Prior Publication Data

US 2004/0004697 A1 Jan. 8, 2004

Related U.S. Application Data

(63) Continuation of application No. 10/099,743, filed on Mar. 15, 2002.

(51) Int. Cl.[7] .......................... G03B 21/00; G03B 21/14
(52) U.S. Cl. .............................. 353/31; 353/32; 353/84
(58) Field of Search .............................. 353/20, 30–34, 353/84, 97, 122

(56) References Cited

U.S. PATENT DOCUMENTS

| 992,151 A | | 5/1911 | Berthon | |
|---|---|---|---|---|
| 5,629,743 A | * | 5/1997 | Lee et al. | 348/751 |
| 5,815,221 A | * | 9/1998 | Kojima et al. | 348/751 |
| 6,163,349 A | * | 12/2000 | Nakanishi et al. | 349/5 |
| 6,398,365 B1 | * | 6/2002 | Takahashi et al. | 353/31 |
| 6,464,359 B1 | * | 10/2002 | Owen et al. | 353/31 |
| 6,547,398 B2 | * | 4/2003 | Cho et al. | 353/31 |

OTHER PUBLICATIONS

J. G. Capstaff, et al., the Kodakotor process for amateur color cinematogragphy, Trans SPME, XII, 36, p. 940 (1928).
F. Weil, The optical–photographic principles of the Agfacolor process, J. SPME, 20 p. 301, Apr. 1933.
J.G. Capstaff et al., The projection of lenticular color films, J. SPME, 28 p. 123, Feb. 1937.
E. Gretener, A brief survey of hte physics and technology of the Berthon–Siemens color process, J.SPME, 28, p. 447, May 1937.
C.H. Evans et al., Color Kinescope Recording on Embossed Film, J. SMPTE, 65, p. 365, Jul. 1956.
W.R.J. Brown et al., Densitometry of an Embossed Kineoscope Recording Film, J. SMPTE, 65, p. 648, Dec. 1956.
Rudolf Kingslake, The Optics of the Lenticular Color–Film process, J. SMPTE, 67, p. 8, Jan. 1958.
Edward M. Crane, et al., Devices for Making Sensitometric Exposures on Embossed Kineoscope Recording Film, J. SPTME, 67, p. 13, Jan. 1958.

* cited by examiner

*Primary Examiner*—David Gray
*Assistant Examiner*—Andrew Sever

(57) ABSTRACT

An optical projection system that produces an image by use of a lenticular array and one or more lightvalves together with different lens filters in a variety of configurations and lenticule shapes.

42 Claims, 12 Drawing Sheets filter mosaic 300

Cylindrical Lenticules 620

Spherical Lenticules 610

RGBW filter 730

RGB filter 720

RGB filter 710

CONFIGURATIONS FOR COLOR DISPLAYS BY THE USE OF LENTICULAR OPTICS

CROSS REFERENCE TO RELATED APPLICATION(S)

This is a continuation of copending application Ser. No. 10/099,743 filed on Mar. 15, 2002, which is hereby incorporated by reference herein.

FIELD OF THE INVENTION

The present invention is directed towards the optics of luminance-chrominance systems for projection displays.

BACKGROUND OF THE INVENTION

Optical projection systems in which the image is generated by light modulated by one or more "lightvalves" are becoming increasingly common. Devices such as televisions, presentation projectors and computer monitors have utilized such lightvalve based projection systems. Typically, in a single lightvalve system, a color image is produced by projecting red (R), green (G) and blue (B) (collectively referred to as "primary" hereinafter) image fields in a time sequential manner with sufficient rapidity that flicker is not apparent. The overall frame rate desired for color images is typically 60 Hertz or greater. Thus, the corresponding interval between each color image field is 1/180th of a second or less.

Single lightvalve systems such as those used in LCD (Liquid Crystal Display) projection systems are relatively inexpensive and the resulting performance is satisfactory. However, an inherent drawback of time sequential lightvalve and other systems is an effect known as 'color breakup artifact' or 'field sequential color artifact'. Color breakup artifact manifests itself to a viewer as a transient rainbow-like fringing effect when rapid eye movements of several degrees are made. The effect is an inherent property of the human visual system but sensitivity to the effect varies greatly from person to person. Moreover, the seriousness of the effect depends strongly on the nature of the image being viewed.

An important issue in evaluating projection system methods is the total number of pixels required, because the cost and complexity of the display normally increase as the number of pixels required increases. In describing various projection systems it is convenient to express the number of pixels as a multiple of the number, N, which is the required number of pixels in the field sequential projection system. In addition to the number of pixels, the final screen luminance should be high enough so that it matches or exceeds the luminance provided by other display systems under commercialization. The final screen luminance of the whites of a projection system, can be expressed as a function of L, the final screen luminance of a field sequential projection system using a single reflecting lightvalve array with a polarizing cube.

A number of methods which have been traditionally used include the use of a separate projection system for each of red, green and blue lamps, or a single lamp with dichroic mirrors providing three separate red, green and blue beams. Another set of methods uses a large mosaic filter with a reflecting lightvalve array and polarizing beamsplitter.

FIGS. 1–4 show some of these methods that may be employed in projection systems. Projection system 100 of FIG. 1 uses three lamps (e.g. projection cathode-ray tubes) 110 to achieve the projection of red, green, and blue images in register on a reflecting or on a translucent screen. This has achieved commercial success, but the cost is high. The light from lamps 110 are filtered by interference filters 120, three in number, which will each increase the luminance of the red, green and blue beams as compared to when using dye-based filters. The red, green and blue light beams resulting from the filtering are each passed thru condensers 130. Condensers 130 are a series of lensing elements that make the light beams spatially uniform (i.e. even out the power of light across the area of the beam). In projection system 100, three lightvalve arrays 140 are used, each within its own beam area, to project red, green, and blue images in register on a translucent screen 160. With the aid of projection lenses 150, the light from the arrays is focused and thus combined onto a single RGB point on screen 160. Registration problems can be reduced by using reflecting arrays since their size can be small compared to the size of the final image. The number of required pixels is 3N.

Alternatively, as shown in FIG. 2, the light from a single lamp is 210 split into red, green, and blue components by three dichroic mirrors 215. The light from dichroic mirrors 215 are filtered by interference filters 220, three in number, which will each increase the luminance of the red, green and blue beams as compared to when using dye-based filters. The red, green and blue light beams resulting from the filtering are each passed thru condensers 230 which make the beams of light spatially uniform. In projection system 200, three lightvalve arrays 240 are also used, each within its own beam area, to project red, green, and blue images in register on a translucent screen 260. With the aid of projection lenses 250, the light from the arrays are focused onto a single RGB lumen on screen 160.

Both projection systems 100 and 200 suffer the cost disadvantages of having three lightvalve arrays and three lenses, of maintaining the registration of the three projected images. The number of total pixels for projection system 200 is again 3N as with the three lamp system 100 of FIG. 1. Compared with the prism assembly method (shown below in FIG. 4), potential advantages are that, if three lamps are used as in system 100, the light output is tripled; or if one lamp is used with beam-splitting dichroic mirrors as in system 200, they are less costly to assemble and manufacture than the prism assembly methods.

An alternative approach is to abandon time sequential imaging while still using only one lightvalve by presenting the primary colors to the viewer in the space domain, rather than in the time domain. One way of constructing such a field sequential system would be to arrange the R, G and B pixels in a mosaic pattern, like the arrangement of phosphor spots in a Cathode Ray Tube device. The lightvalve would be illuminated using white light, and each R pixel would be covered with a red filter, each G pixel with a green filter and each B pixel with a blue filter. The requisite filter array would contain about $10^6$ or more filters. Furthermore, in the case of a micro-display lightvalve array, each filter would measure only $10 \times 10 \ \mu m^2$. Though conceptually easy, implementing such large filter arrays and such small individual filters could be prohibitively expensive. Disadvantageously, mosaic filter arrays need about three times as many pixels.

FIG. 3 shows one such mosaic filter 300 that can be employed in a projection system. Mosaic filter 300 contains a pattern of red, green and blue pixel locations. In light-sensitive arrays (such as CCD arrays) more green cells are usually incorporated than red or blue cells. Where required mosaic filter 300 may instead be composed of cyan, magenta, yellow, and green cells or any combination of colors. For most displays, the relative numbers of red, green, and blue cells have to be chosen to maximize the luminance of the display and to keep the total number of cells to a minimum. To meet these requirements an equal number of red, green, and blue cells are used as in the case of mosaic filter 300.

Single transmitting LCD arrays, covered with a mosaic of red, green, and blue filters, such as filter mosaic 300, provide either panel displays illuminated by fluorescent lamps or projected displays by means of overhead projectors. In projection system 400 of FIG. 4, a reflecting LCD array 430 is used with mosaic filters 440 to provide a projected image based on light originating from a single lamp 410. Reflecting array 440 is used because its small size makes a compact projector possible. Condenser 420 makes the light from lamp 410 to be spatially uniform. Field lens 450 transmits the image onto the appropriate position on projection lens 490. The image rays are first passed through a polarizing cube 470 which allows any light arriving in a given direction X to pass through its hypotenuse while reflecting back any light perpendicular to that direction X. The projection lens 490 focuses the filtered light output from polarizing cube 470 onto a screen or other destination (not shown). Some advantages of projection system 400 are that only one light-valve array is used, no temporal color break-up can occur, and no prism assembly is required. A disadvantage is that the filters 440 have to be made of dyes and thus have lower transmittances than the interference filters used in the filter wheel of the field sequential system or in the dichroic elements of the prism assembly. The number of pixels required for this mosaic method is usually 3N.

One other arrangement of avoiding the mosaic filters is to provide a rapidly revolving red, green, and blue filter wheel in front of a single reflecting LCD array with a polarizing beam-splitting cube. The use of a reflecting array makes it possible to incorporate micro-circuits beneath the pixels without loss of light; and illuminating them with a polarizing beam-splitter cube makes for a convenient and efficient arrangement. However, the field sequential system provided by the rotating filter wheel results in disturbing color break-up for some observers. The use of three lightvalve arrays, with a dichroic prism assembly to combine the three images, avoids the color break-up, but involves the added costs of two extra arrays and the prism assembly.

Alternative methods of projecting images, using light-valve arrays to produce color displays, are therefore of interest.

SUMMARY

The invention in one or more embodiments consists of a lenticular array and one or more lightvalves together with lens filters that serve to synthesize mosaic filters in an optical projection system that produces an image.

In various embodiments, the filters correspond and align with the shape and configuration of lenticules in the lenticular array. Also, in various embodiments, the lightvalves may be of a transmitting or reflecting type and in most embodiments, the lenticular array is built onto one of the lightvalves. Further, in various embodiments, the luminance and chrominance components of the image to be projected may be processed into separate signals.

DETAILED DESCRIPTION OF THE INVENTION

The invention is directed toward emulating a mosaic filter in a novel manner that also can reduce color breakup artifact. One or more embodiments described herein is a optical projection system with a lenticular array and a large filter which is placed at the projection lens' aperture stop.

Figure 5:
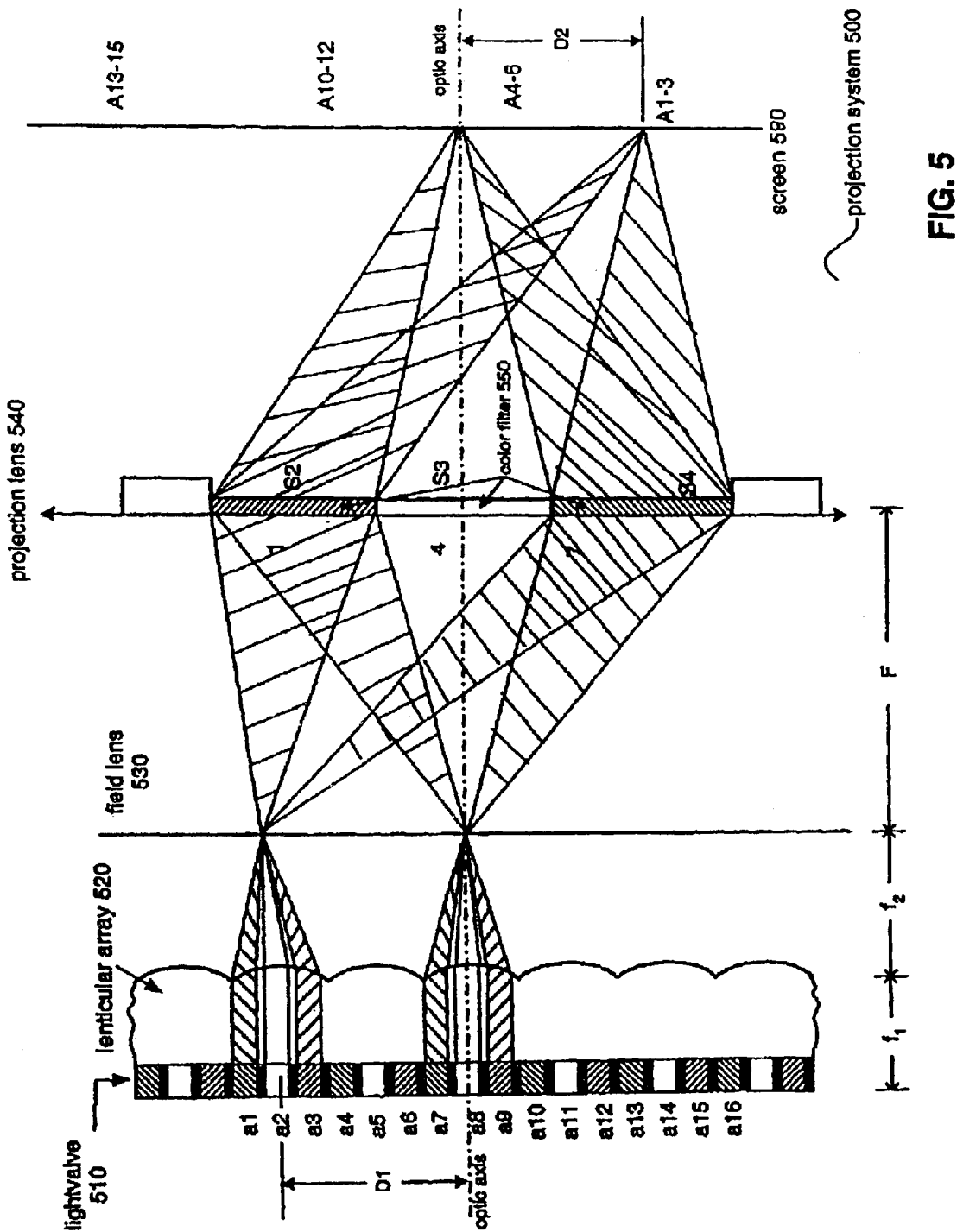
FIG. 5 illustrates the optical principles underlying a lightvalve and lenticular array based projection system in accordance with one or more embodiments of the invention.

FIG. 5 illustrates the optical principles underlying a lightvalve and lenticular array based projection system in accordance with one or more embodiments of the invention. In optical projection system 500, the field lens 530 and projection lens 540 are assumed for clarity, to be ideal and thin. Also, to simplify the illustration, only rays that leave the lightvalve 510 parallel to the optic axis (OA) are shown.

The spacing between the field lens 530 and projection lens 540 is F, which (in this example) is equal to the focal length of the field lens. In optical projection system 500, it is assumed that the lenticular array 520 is cylindrical in composition, and that each lenticule is wide enough to cover three pixels (for instance, a1, a2 and a3), one of each primary color. The function of the lenticular array 520 is to ensure that, after passing through it, all of the R (Red) rays lie within a single band of angles, independently of their starting point on the lightvalve 510, all of the G (Green) rays lie within a second band of angles, and all the B (Blue) rays within a third band of angles. In FIG. 5, for example, the angular bands, measured with respect to the optic axis, are approximately 37.5° to 12.5° for R, −12.5° to 12.5° for G and 12.5° to 37.5° for B.

The function of the field lens 530 is to transform these angular ranges into spatial regions at the aperture stop of the projection lens 540. Thus, the R rays fill the lower third of the stop, the G rays the middle third (labeled Section 4), and the B rays the upper third (labeled Section 1). The filter 550 is placed at the plane of the projection lens 540 and thus, also takes on three sections, the lower third being Red (R) and labeled Section 7, the middle being Green (G) and labeled Section 4, and the upper third being Blue (B) and labeled Section 1. Filter 550 consists of three differently colored glasses: the R rays go through a red filter, the G rays through a green filter, and the B rays through a blue filter. In this way, the lenticular array 520, the field lens 530 and the filter 550 emulate the function of a mosaic filter array placed over the lightvalve 510.

Optical projection system 500 maps each pixel of the lightvalve into a corresponding location on screen 590. A portion of the lightvalve 510 shown in FIG. 5 is a vertical section through one column with each lenticule divided into three sections $a_k$, $a_{k+1}$, and $a_{k+2}$ (where k is a non-zero whole number), which represent R, G and B rays, respectively. Optical projection system 500 has the following characteristics and parameters:

The focal length of the lenticules (of any section of the lenticular array 520) into glass is $f_1$, The focal length of the lenticules (of any section of the lenticular array) into air is $f_2$.

Thus, if the glass has a refractive index of Z, and the radius of curvature of each lenticule is R, then:

$$\frac{Z}{f_1} = \frac{1}{f_2} = \frac{Z-1}{R}$$

The color filter 550 is placed at the plane of the projection lens 540 through its aperture stop. (In the case of a thick projection lens, it would be placed approximately at its principal plane.)

The focal length of the field lens 530 is F, and the separation between the field lens 530 and projection lens 540 is also equal to F.

The rays emanating from pixels a1, a2 and a3 on the lightvalve 510 are assumed to be parallel to the optic axis. The rays emanating from a1, a2 and a3 are brought to a common image point A1-3 on the screen 590. In the section shown, all the rays from a1 pass through the region S4 in the plane of the projection lens 540. This corresponds to Section 1 of the filter 550. Similarly, the rays emanating from a2 pass through the region S3 in the plane of projection lens 540, corresponding to Section 4 of the filter 550. The rays emanating from a1 pass through the region S2 in the plane of projection lens 540, corresponding to Section 7 of the filter 550.

Similar rays (i.e. rays parallel to the optic axis) emanating from pixels a4, a5 and a6 are not depicted in FIG. 5, but given the optical characteristics of the system, these rays are also brought to a common image point on screen 590. All the rays emanating from a4 pass through Section 7 of filter 550, those from a5 pass through Section 4 and those from a6 pass through Section 1.

By induction, referring to FIG. 5, in general:

All rays emanating parallel to the optic axis from any group of three pixels served by the same lenticule are brought to a common image point on screen 590.

All the rays emanating parallel to the optic axis from pixels such as a1, a4, a7, . . . a(1+3n), where n is an integer, pass through Section 7 of the filter 550.

All the rays emanating parallel to the optic axis from pixels such as a2, a5, a8, . . . a(2+3n), where n is an integer, pass through Section 4 of the filter 550.

All the rays emanating parallel to the optic axis from pixels such as a3, a6, a9, . . . a(3+3n), where n is an integer, pass through Section 1 of the filter 550.

Further, FIG. 5 has been drawn as an approximation and is not to scale, but the optics therein should also have these properties:

1) The distance (D1) between the image point in the plane of lightvalve 510 and the optic axis is proportional to the distance (D2) between the central pixel in the group of 3 and the optic axis in the plane of the lightvalve 510; and 2) The constant of proportionality between distances D1 and D2 is equal to the magnification of the projection lens.

Also, referring again to FIG. 5, in general:

All the rays emitted from the centers of pixels a1, a4, a7, . . . a(1+3n), where n is an integer, pass through the center of Section 7 of the filter 550.

All the rays emitted from the centers of pixels a2, a5, a8, . . . a(2+3n) pass through the center of Section 4 of the filter 550.

All the rays emitted from the centers of pixels a2, a5, a8, . . . a(2+3n) pass through the center of Section 1 of the filter 550.

For illustration, assume that a white area is being imaged. Then regions such as A13-15, A10-12, A7-9, A4-6, and A1-3 will be colored white, and the regions between them will (to first order) not be illuminated. Since patch A13-15 represents a combination of pixels a13, a14 and a15, and so on, this means that each group of 3 pixels (not the individual pixels themselves) of the lightvalve 510 is represented at the screen 590.

Figure 6B:
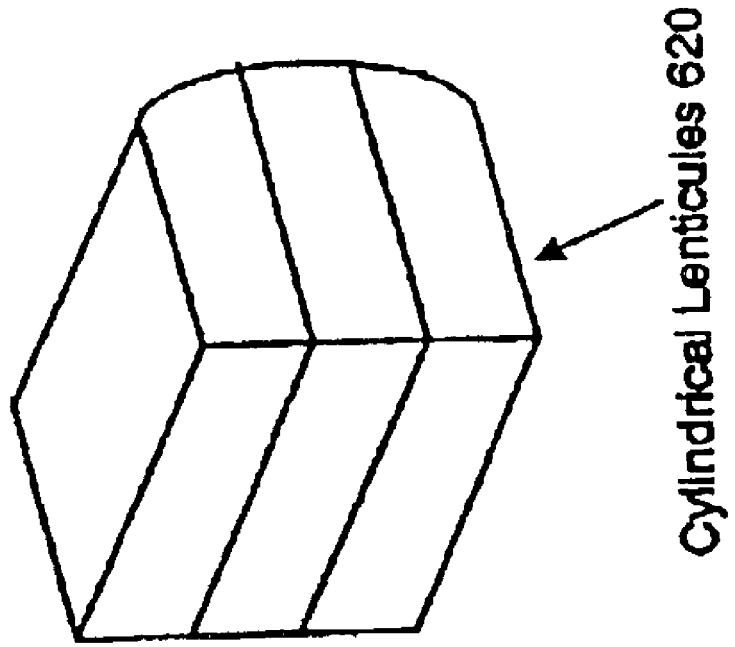
FIGS. 6(*a*)–(*b*) illustrate various lenticules that may be employed in one or more embodiments of the invention.
Figure 6A:
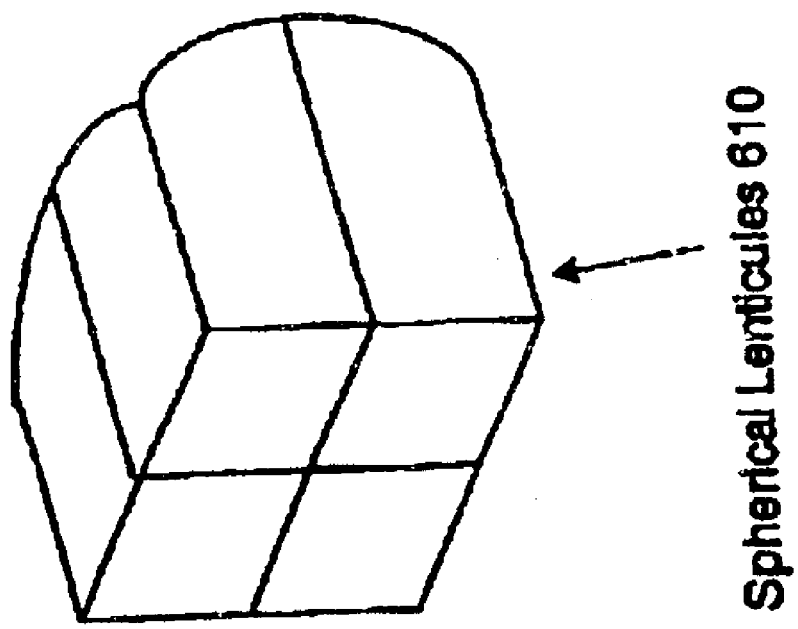

FIGS. 6(a)–(b) illustrate various lenticules that may be employed in one or more embodiments of the invention. If it is desirable to use spherical lensing elements, a spherical lenticule 610, such as that shown in FIG. 6(a), can be used in implementing a lenticular projection system. Each spherical lenticule 610 is situated above groups of four adjacent pixels that form a square in the lightvalve. This spherical lenticule 610 is repeated over an entire lightvalve. The spherical lenticule 610 should be dimensioned such that it covers precisely four pixels in a square. Of the four pixels in each group which is covered by lenticule 610, in some embodiments, one pixel carries a red signal, one pixel carries a green signal, one pixel carries a blue signal, and the fourth pixel carries either a red, or a green, or a blue signal. In other embodiments the fourth signal could be a pure white signal that enhances the luminance of the final image. While increasing overall luminance, White as the fourth signal cuts the saturation (chrominance) available when compared to if white were replaced by a filter of a primary color. If the spherical lenticule 610 is used in constructing the lenticular array, then any corresponding projection lens should be covered with a four-part filter array. This array should be oriented such that light rays from each pixel in the groups of four (i.e. each of the four sections in the spherical lenticule 610 passes through only one part of the filter array. One advantage of using spherical lenticule 610 is that pixels are square in shape making their projection less complicated than non-square pixels.

However, if it is desirable to use cylindrical lensing elements, then a cylindrical lenticule 620, such as that shown in FIG. 6(b), can be used in implementing a lenticular projection system. Each cylindrical lenticule 620 is situated above groups of three adjacent pixels that form rectangular stripes in a lightvalve. Cylindrical lenticule 620 is repeated over an entire lightvalve. The cylindrical lenticule 620 should be dimensioned such that it covers precisely three pixels in stripes.

Of the three pixels in each group which is covered by lenticule 620, one carries a red signal, one carries a green signal, and one carries a blue signal. Each pixel in each row would need to be three times as long in the direction parallel to the lenticules as in the direction at right angles to them, so that the format of the array would not be altered. If the cylindrical lenticule 620 is used in constructing the lenticular array, then any corresponding projection lens should be covered with a three-part filter array.

In one implementation, such projection lens is covered with a stripe (or segment) of red filter, a stripe (or segment) of green filter, and a stripe (or segment) of blue filter. Each of the stripes are of equal width but, on a circular lens, the central stripe is longer than the top and bottom stripes. It may therefore be advantageous to use this stripe for the color which is most limited for light. The stripes on the lens are parallel to the cylindrical lenticules. The set of lenticules can be parallel to the lines forming the picture or at right angles to them, according to whichever configuration is the more advantageous. Though the pixel is rectangular in shape, the number of requisite pixels can be only 3/4 of that of spherical lenticule systems.

Figure 7C:
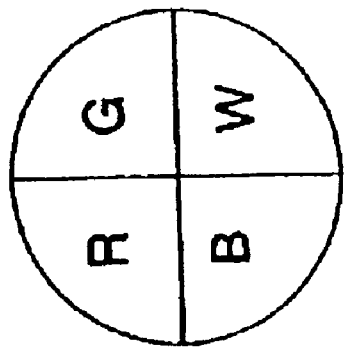
FIGS. 7(*a*)–(*c*) illustrates various filters that may be employed in one or more embodiments of the invention.
Figure 7B:
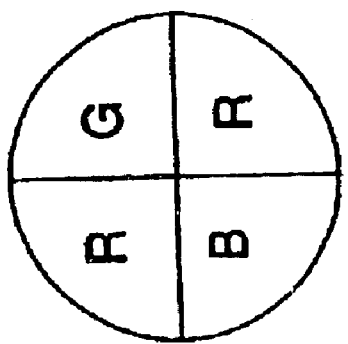
Figure 7A:
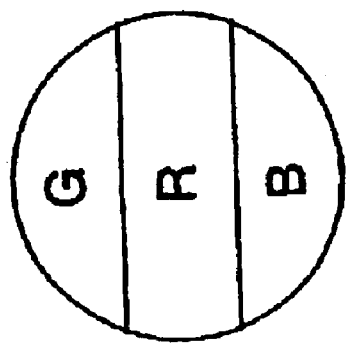

FIGS. 7(a)–(c) illustrates various filters that may be employed in one or more embodiments of the invention. RGB filter 710 of FIG. 7(a) is composed of three stripes, a first, topmost stripe carrying Green (G), a second middle stripe carrying Red (R) and the third, bottom stripe carrying Blue (B). The middle stripe is longer than the top and bottom stripes, and can thus be used for the color which is most limited for light, e.g. Red. The RGB filter 710 would be fitted over a projection lens in a projection system where the lenticular array was cylindrical, and used lenticules similar to lenticule 620 shown in FIG. 6(b).

RGB filter 720 of FIG. 7(b) is composed of four segments, each segment a one-quarter portion (i.e. a quadrant of the circle) of the entire filter 720. The top leftmost segment carries Red (R), the top rightmost segment carries Green (G) while the bottom leftmost segment carries Blue (B). In the configuration of filter 720, the bottom rightmost segment also carries a Red (R) signal, such that if Red is the most light-limited, it would yield a brighter projected image. In other configurations, the arrangement of Red, Green and Blue and duplication of one of the primary color signals may be varied as required by the arrangement of pixels on the lightvalve. Further, the choice of which primary to repeat may depend upon the spectral composition of the original light source. The RGB filter 720 would be fitted over a projection lens in a projection system where the lenticular array was spherical, and used lenticules similar to lenticule 610 shown in FIG. 6(a).

In other embodiments, a four-part RGBW filter 730 (shown in FIG. 7(c)) can instead be used in a projection system that uses a spherical lenticular array. RGBW filter 730 of FIG. 7(c) is composed of four segments, each segment a one quarter portion (i.e. a quadrant of the circle) of the entire RGBW filter 730. The top leftmost segment carries Red (R), the top rightmost segment carries Green (G) while the bottom leftmost segment carries Blue (B). In the configuration of RGBW filter 730, the bottom rightmost segment also carries a White (W) signal, which may thereby yield a projected image with a greater luminance than a pure RGB only system. In other configurations, the arrangement of Red, Green and Blue and White color signals may be varied as required by the arrangement of pixels on the lightvalve.

Figure 8:
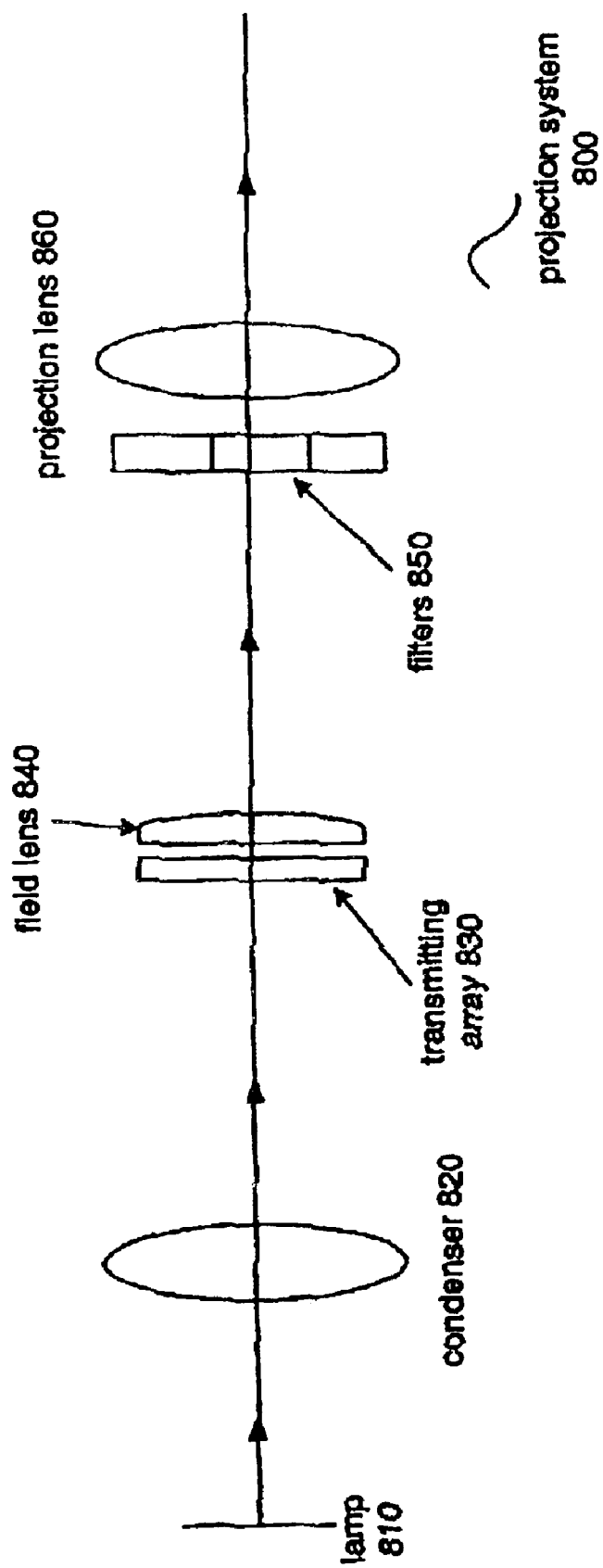
FIG. 8 illustrates a cylindrical Red, Green and Blue lenticular projection system with a transmitting lightvalve array.

FIG. 8 illustrates a cylindrical lenticular projection system with a transmitting array. Projection system 800 consists first of a lamp 810 which is typically a spherical light source with a reflector. Lamp 810 sends light to a condenser 820 which refracts that light such that it is spatially uniform and parallel to the axis but with a range of angles typical of condenser lenses. The light from the output of condenser 820 passes through a transmitting array 830. Transmitting array 830 includes a lightvalve array covered by a lenticular array, which in this embodiment, has a field of cylindrical lenticules, such as the one illustrated in FIG. 6(b).

In non-lenticular projection systems (e.g. slide or motion projection systems), the red, green, and blue exposures occur on the film at positions such that the light, during projection, retraces its path. There is therefore no problem caused by the rays near the edges of the picture not being at right angles to the lenticular array. When using lenticules with a lightvalve array (transmitting array 830), a field lens 840 is used to ensure that the central beam to the projection lens is always at right angles to the lenticules in all parts of the picture. Alternatively, the lenticular array can be used in the manufacture of the light valve pixels to position them appropriately to allow for the angles of the light at different parts of the picture.

Figure 1:
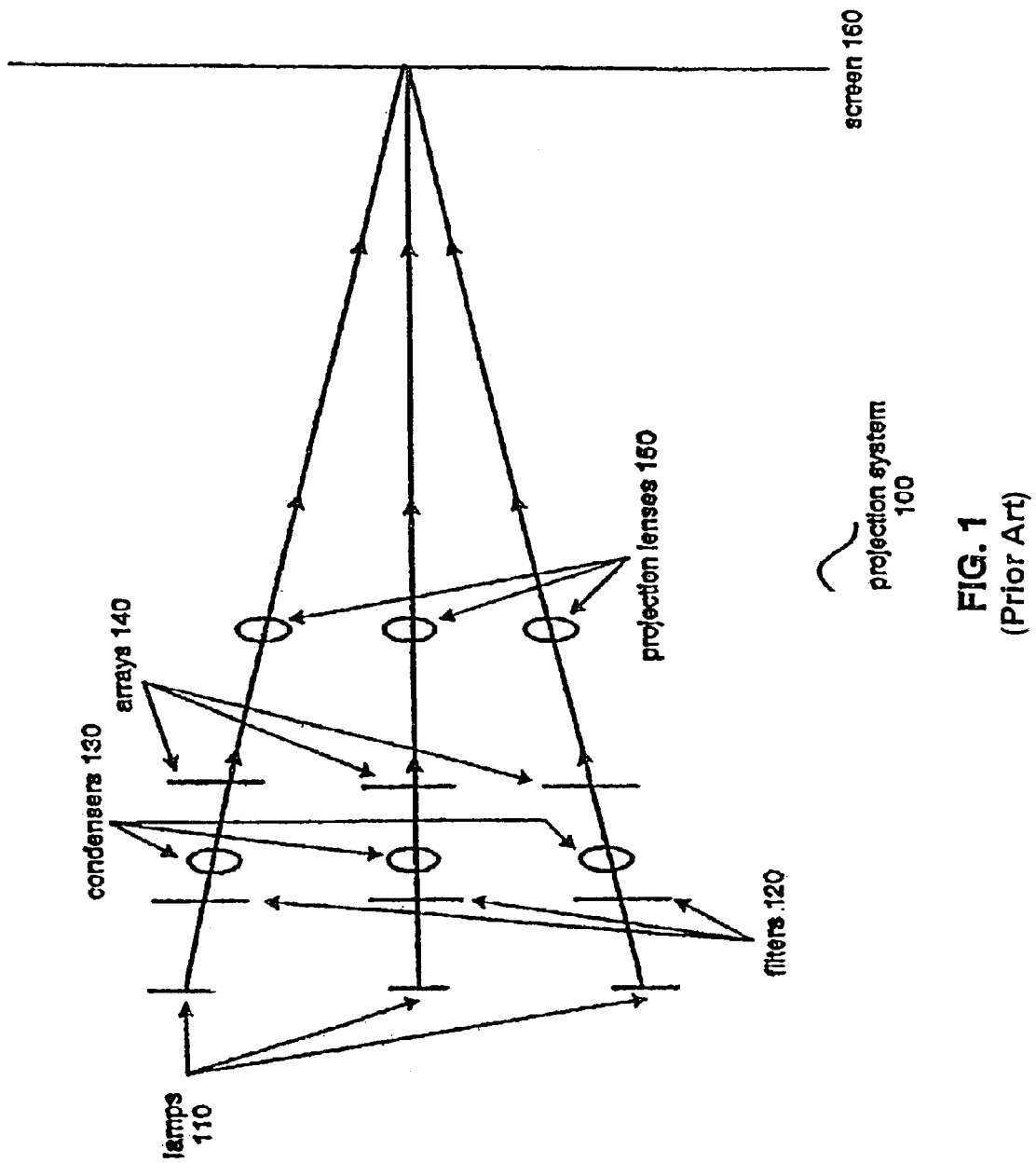
FIG. 1 illustrates a typical triple projection system using three lamps.
Figure 2:
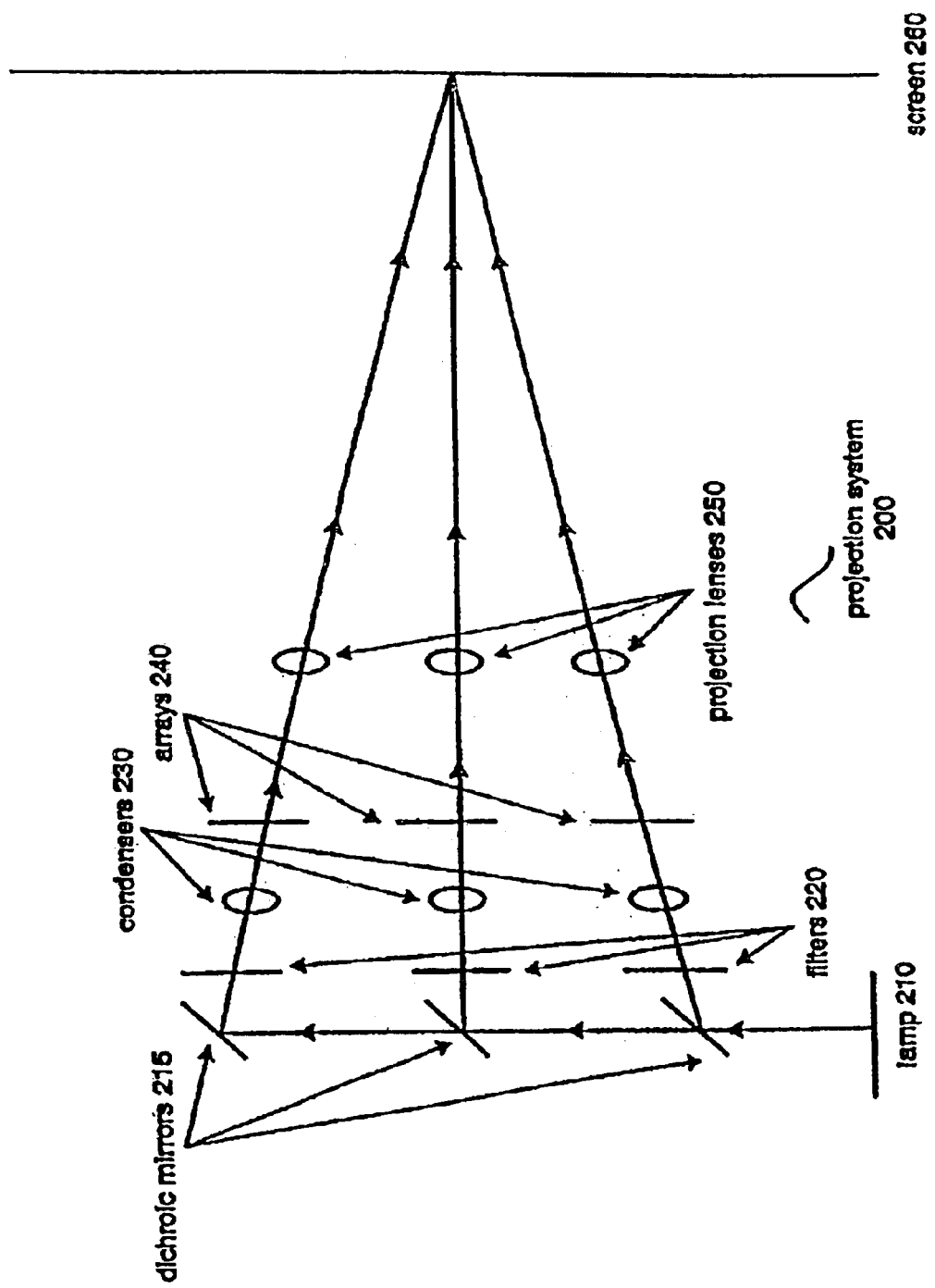
FIG. 2 illustrates a typical triple projection system using one lamp.
Figure 3:
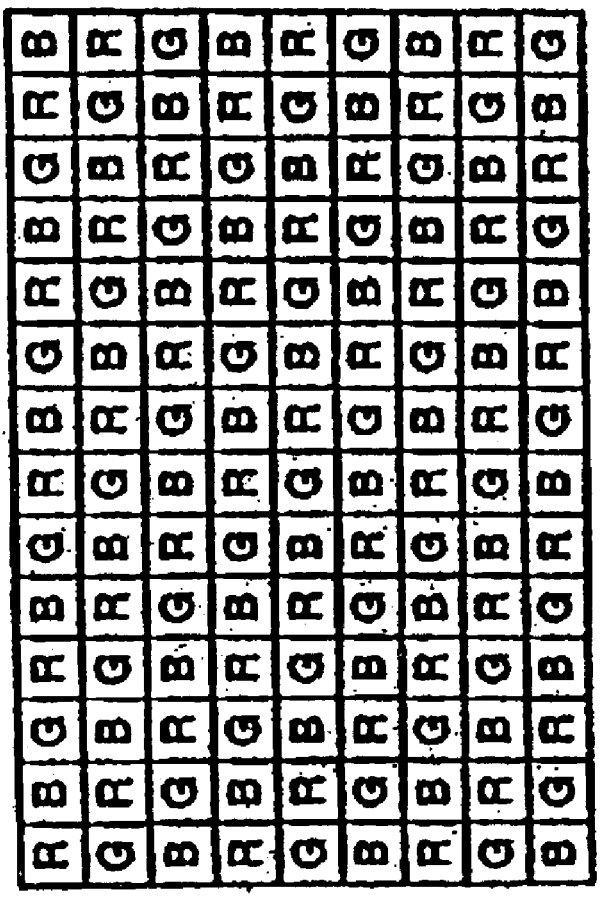
FIG. 3 illustrates a typical filter mosaic utilized in a typical LCD array based projection system.
Figure 4:
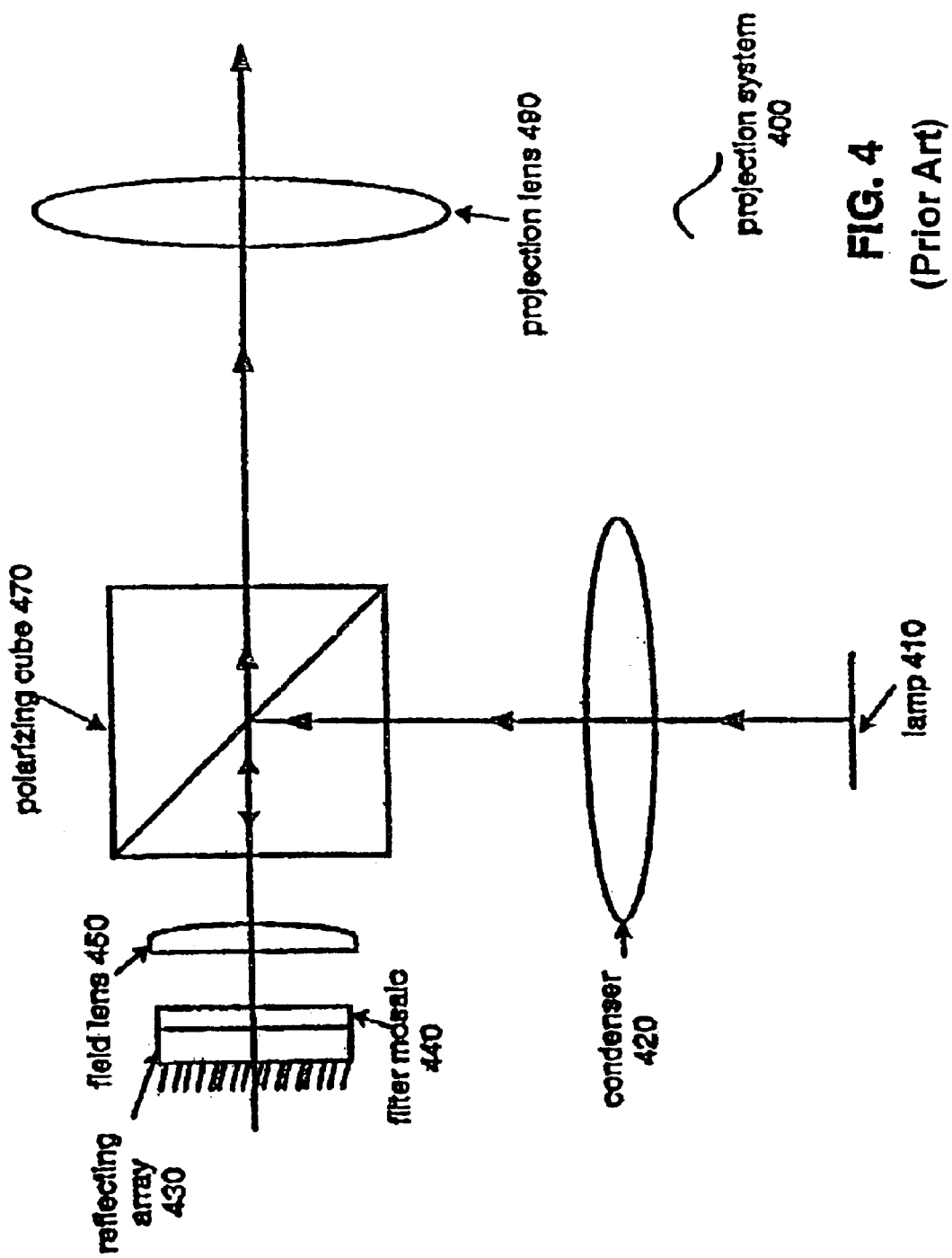
FIG. 4 illustrates a typical single LCD transmitting array based projection system.

The function of field lens 840 is to transform beams of light filling certain angular bands into spatial ranges at the aperture stop of a projection lens 860. Light emerging from the field lens 840 is first passed through filter 850. Since the lenticular array of the transmitting array 830 consists of cylindrical lenticules, filter 850 should be similar to filter 710 depicted in FIG. 7(a), and should have a stripe of Red, Green and Blue for a total of three stripes. The arrangement of these stripes would depend on the pattern of the pixels in the transmitting array 830. The Red rays will pass through the Red stripe of the filter 850, the Blue rays will pass through the Blue stripe of filter 850 and the Green rays will pass through the Green stripe of filter 850. The projection lens 860 focuses the filtered light output from filter 850 onto a screen or other destination (not shown). The three rays, Red, Green and Blue, for a given pixel, are combined onto one location on that screen/destination by the projection lens 860. The lenticular array of transmitting array 830, the field lens 840 and filter 850, in combination with one another serve to emulate a large mosaic filter placed over a lightvalve array (as was depicted in FIG. 3 and FIG. 4) with less expense. Interference filters, such as filter 850, may be used over the projection lens 860 to maximize their transmittance.

Projection system 800 is advantageous in that the mosaic filter is avoided and replaced instead by embossed lenticules (over the lightvalve array of transmitting array 830). Compared to a field sequential projection system, which has N pixels, the use of separate Red, Green and Blue signals, increases the total number of pixels for projection system 800 to 3*N. Further, these pixels are rectangular in shape, which may be inconvenient in dimensioning the final screen projection.

Another measure to consider is the final screen luminance of whites generated by projection system 800. Assume L is the final screen luminance of whites in a field sequential projection system using a single reflecting lightvalve array with a polarizing cube. Then, the final screen luminance of the projection system 800 could be expressed as A*3*L, where A is the ratio of the area of the shortest stripe of the filter of the projection to the total filter area. For instance, if the filter 710 of FIG. 7(a) is used, and if the widths of three stripes are equal, then the top and bottom stripes have an area of 0.28 of that of the total filter, while the center stripe has an area of 0.44 of that of the total filter. In such a case, the final screen luminance would be 0.28*3*L or 0.84*L which is less than the final screen luminance of a field sequential system by 16% ignoring any differences in the light losses between the polarizing cube and the lenticular optics.

Figure 9:
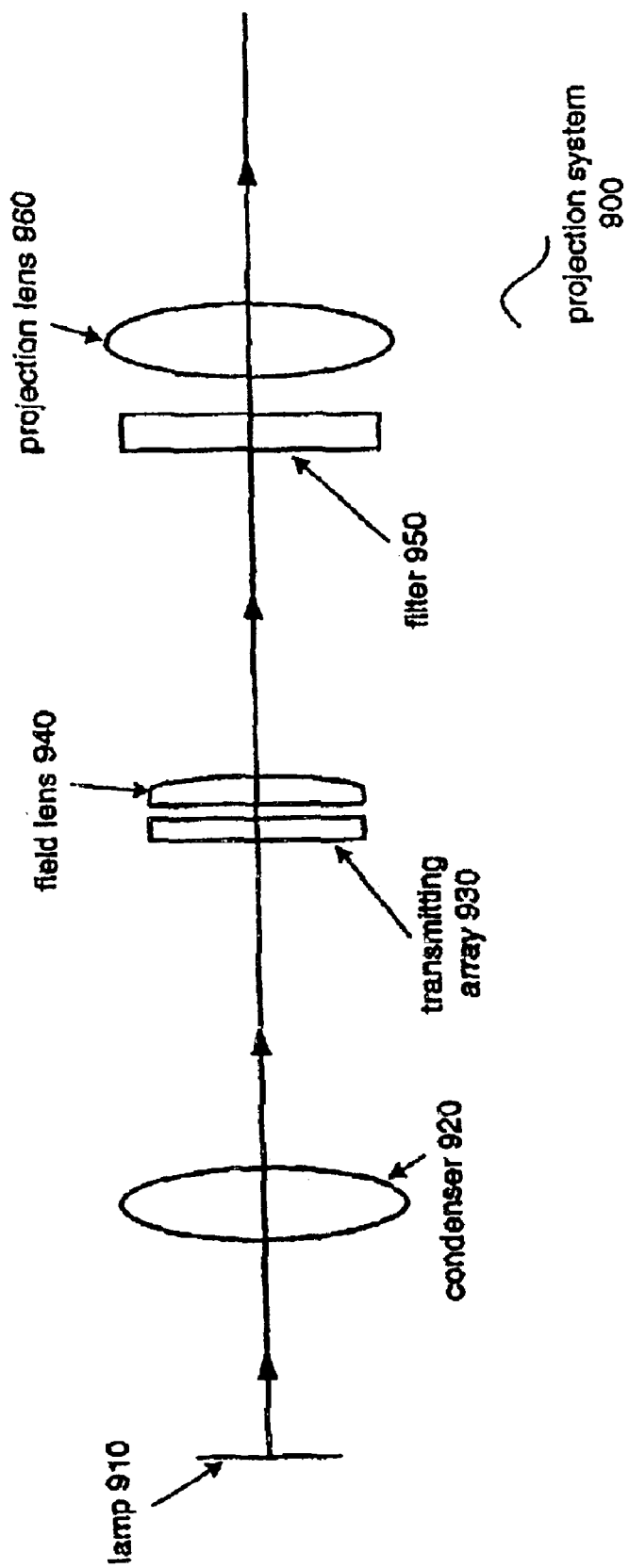
FIG. 9 illustrates a spherical lenticular projection system with a transmitting lightvalve array.

FIG. 9 illustrates a spherical lenticular projection system with a transmitting lightvalve array. Projection system 900 consists first of a lamp 910 which is typically a spherical light source with a reflector. Lamp 910 sends light to a condenser 920 which refracts that light to become spatially uniform. The light from the output of condenser 920 passes through a transmitting array 930. Transmitting array 930 includes a lightvalve array covered by a lenticular array, which in this embodiment, has a field of spherical lenticules, such as the one illustrated in FIG. 6(*a*).

In non-lenticular projection systems (e.g. slide projection or motion picture systems), the red, green, and blue exposures occur on the film at positions such that the light, during projection, retraces its path. There is therefore no problem caused by the rays near the edges of the picture not being at right angles to the lenticular array. When using lenticules with a lightvalve array (transmitting array 930), a field lens 940 is used to ensure that the central beam to the projection lens is always at right angles to the lenticules in all parts of the picture. Alternatively, the lenticular array can be used in the manufacture of the light valve pixels to position them appropriately to allow for the angles of the light at different parts of the picture.

The function of field lens 940 is to transform beams of light filling certain angular bands into spatial ranges at the aperture stop of a projection lens 960. Light emerging from the field lens 940 is first passed through filter 950. Since the lenticular array of the transmitting array 930 consists of spherical lenticules, filter 950 could be similar to filter 720 depicted in FIG. 7(*b*), having a quarter segment of Red, quarter segment of Green, quarter segment of Blue and an extra quarter segment of a primary color. The arrangement of these segments would depend on the pattern of the pixels in the transmitting array 930. The Red rays will pass through the Red segment(s) of the filter 950, the Blue rays will pass through the Blue segment(s) of filter 950 and the Green rays will pass through the Green segment(s) of filter 950. The projection lens 960 focuses the filtered light output from filter 950 onto a screen or other destination (not shown). The four rays, Red, Green, Blue and one of Red, Green or Blue, for a given pixel, are combined onto one location on that screen/destination by the projection lens 960. The lenticular array of transmitting array 930, the field lens 940 and filter 950, in combination with one another serve to emulate a large mosaic filter placed over a lightvalve array (as was depicted in FIG. 3 and FIG. 4) with less expense. Interference filters, such as filter 950, may be used over the projection lens 960 to maximize their transmittance.

Projection system 900 is advantageous in that the mosaic filter is avoided and replaced instead by embossed lenticules (over the lightvalve array of transmitting array 930). Compared to a field sequential projection system, which has N pixels, the use of separate Red, Green and Blue signals and an extra primary color signal, increases the total number of pixels for projection system 900 to 4*N. Compared to projection system 800, which uses rectangular shaped pixels, projection system 900 has the advantage of using square shaped pixels.

Another measure to consider is the final screen luminance of whites generated by projection system 900. Assume L is the final screen luminance of whites in a field sequential projection system using a single reflecting lightvalve array with a polarizing cube. In one embodiment, the final screen luminance of the projection system 900 could be expressed as A*3*L, where A is the ratio of the area of a segment of the filter of the projection to the total filter area. In this embodiment, if filter 950 is of the same type as RGB filter 720 of FIG. 7(*b*), since the area of the segments are equal, then each segment would have an area of 0.25 of that of the total filter. In such a case, the final screen luminance would be 0.25*3*L or 0.75*L which is less than the final screen luminance of a field sequential system by 25% ignoring any differences in the light losses between the polarizing cube and the lenticular optics.

In alternate embodiments, where filter 950 is of the same type as RGBW filter 730 of FIG. 7(*c*), then the filter 950 would have a quarter segment of Red, quarter segment of Green, quarter segment of Blue and an extra quarter segment of white (colorless). The number of pixels does not change and is 4*N. However, the final screen luminance is improved by a factor of 1/3, since the extra White ray adds 0.25 of pure white luminance to the total luminance of each output pixel. Thus, the final screen luminance would be 1.0*L (0.75*L+ 0.25*L), which is identical to that of field sequential systems. The addition of a luminance signal as the fourth signal increases the total transmittance of the three primary colors. While this may be advantageous, implementing such an embodiment may also need special signal processing techniques that can handle Red, Green, Blue and pure luminance components in the final image.

In alternate embodiments, if other arrays are used, any difference between the transmittance factor of a transmitting array and the reflectance factor of a reflecting array used in the field sequential system will affect the final screen luminance. However, for chromaticities of higher purity produced by a mixture of red, green, blue and white filters, the maximum luminances relative to that of a white signal are reduced by factors of between 1 and 0.75 below those of pure RGB filtering systems. Or if a both arrays are reflecting lenticular arrays, the reflectance factor.

Figure 10:
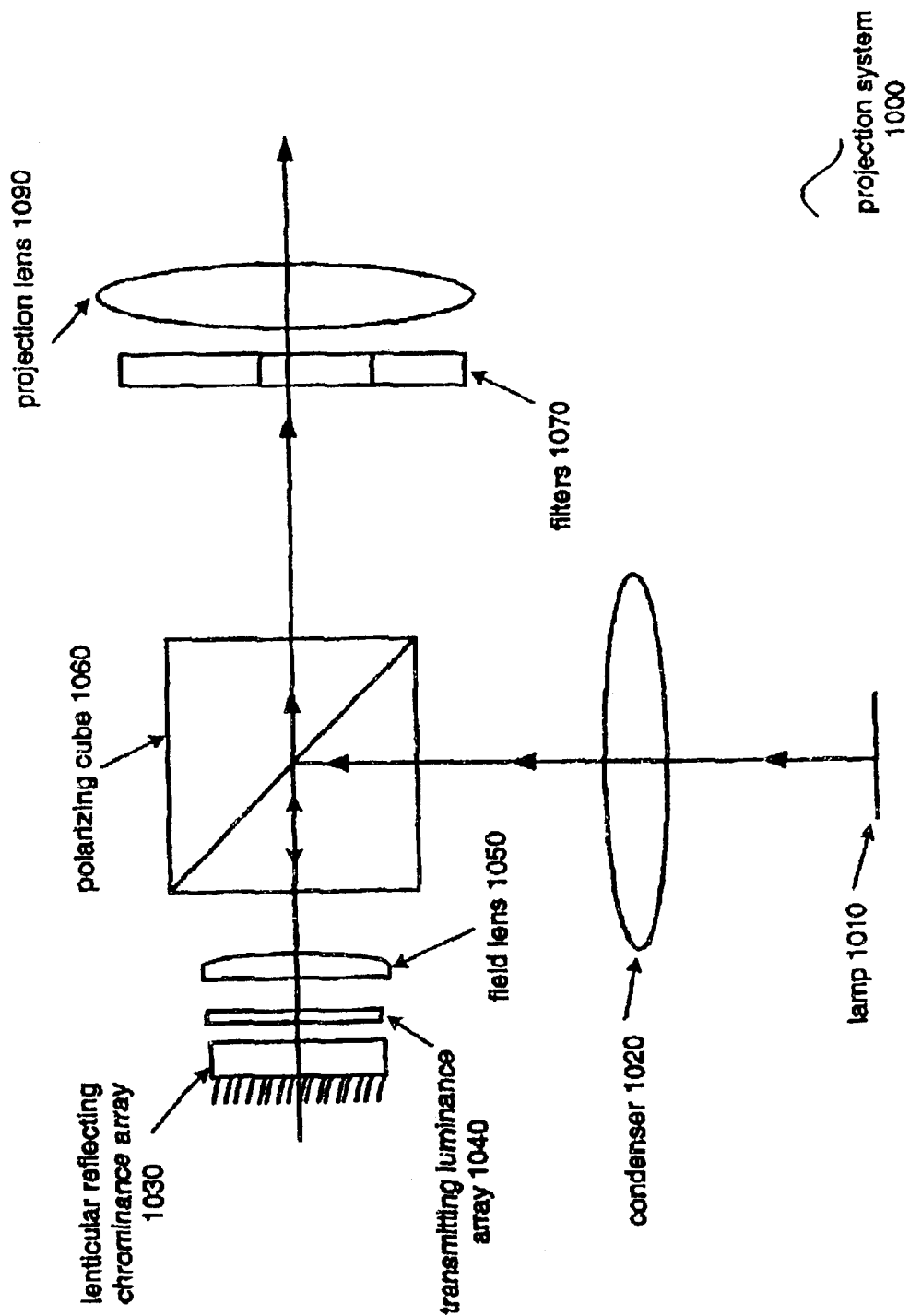
FIG. 10 illustrates a cylindrical Red, Green and Blue lenticular projection system with a reflecting chrominance array and transmitting luminance array.

FIG. 10 illustrates a lenticular projection system with a reflecting chrominance array and transmitting luminance array. In projection system 1000, the display signals are separated into chrominance and luminance components. A true chrominance display has constant luminance, and this would have to be produced by the triplets of pixels (in the cylindrical lenticular methods). For the luminance to be constant for all groups of pixels, it would have to be constant for all chromaticities within the display gamut. This means that the luminance level would have to be that of the chromaticity whose maximum luminance is the lowest. Typically, broadcast television saves bandwidth, but due to the effects of gamma correction, some of the luminance is carried by the chrominance signals. Such signals where some luminance is carried is referred to as "pseudo-chrominance" signals. Systems with pseudo-chrominance signals also have what are referred to as "pseudo-luminance" signals that carry only part of the total luminance.

The display of projection system 1000 is initiated by a lamp 1010 which is typically a spherical light source. The light supplied by lamp 1010 is shone into an condenser 1020. Condenser 1020 causes the light from lamp 1010 to become spatially uniform. The light is first passed through a polarizing cube 1060 which allows any light arriving in a given direction X to pass through its hypotenuse while reflecting back any light perpendicular to that direction X.

On a lenticular reflecting chrominance array 1030, the chrominance signal is used to produce, in each group of three pixels underneath a cylindrical lenticule, the levels required to generate an image. Correspondingly, a filter 1070 is placed proximate to the projection lens 1090. Filter 1070 is similar to filter 710 of FIG. 7(*a*) in that it consists of three stripes, one Red, one Green and one Blue, matching the pattern of pixels in lenticular array 1030. After passing through the red, green, and blue stripes of filter 1070 on the projection lens 1090, these signal levels result in the chrominance features of the picture being displayed at constant luminance. Placed close to the lenticulated surface covering the reflecting chrominance array 1030 is a transmitting luminance lightvalve array 1040 such as can be provided by an array of transmitting LCD cells. The luminance signal is applied to the transmitting array 1040. The projection lens 1090 focuses the light controlled by this luminance array signal sharply on the output screen or destination (not depicted).

To summarize, the lenticular reflecting chrominance array 1030 modulates the chrominance component of the image. The transmitting luminance lightvalve array 1040, separately and independently of the array 1030, modulates the luminance component of the image. This has the advantage of being able to use a smaller array for the chrominance component at higher resolutions. The separately modulated luminance and chrominance components pass through the polarizing cube 1060 and at the projection lens 1090.

The total number of pixels in projection system 1000 depends upon the number of RGB triplets of pixels that is required, since the lenticular array 1030 uses cylindrical lenticules, in this embodiment. The middle stripe of filter being red enables 57% (assuming all three filter stripes are of equal width, and a circular filter) more red light than in the case of the field sequential system. Hence the reduction in luminance would be only to about 47% instead of to about 30%, if the luminance was equal to the maximum attainable at the chromaticity of the red phosphor. If a pseudo-chrominance signal is used that had the maximum attainable luminance at all chromaticities, there would again be no reduction in luminance, and there would be less luminance to be carried by the pseudo-chrominance signal at all chromaticities involving the red light. This way ensure that the increase in the number of pseudo-chrominance triplets need only be to one for every nine "pseudo-luminance" (carrying only part luminance) pixels. Thus, the total number of pixels would be equal to $3*(1/9)*N+N=1.33*N$.

To decrease the total number of pixels in the above methods, the pseudo-chrominance and pseudo-luminance may be replaced instead by a pure chrominance and pure luminance signals. It is then possible, as has been shown in the art, to use one sixteenth as many triplets of chrominance pixels as luminance pixels. The number of pixels required is then N for the luminance display, and $(3/16)*N$ for chrominance, making a total of $(19/16)*N$. Compared to projection system 1000 using pseudo-chrominance, this has the advantage that the number of pixels is only $(19/16)*N=1.19*N$ instead of $1.33*N$. A disadvantage is that the chrominance display will absorb some of the light. The differences in this regard are described below in the section entitled "Transmittance of chrominance and pseudo-chrominance" displays.

The final screen luminance of system 1000 has a value reduced by any reduction in luminance caused by the pseudo-chrominance display (if used) and the absorption in the additional transmitting luminance array 1040. Alternatively, the final screen luminance may be reduced by the difference between the transmittance factor of two transmitting arrays, if used, and the reflectance factor of the reflecting array 1030 or the transmittance factor of a single transmitting array. As described, the final screen luminance of the projection system 1000 could be expressed as $A*3*Y$, where A is the ratio of the area of the shortest stripe of the filter of the projection to the total filter area, and Y a reduction factor. For instance, if the filter 710 of FIG. 7(*a*) is used, and if the widths of three stripes are equal, then the top and bottom stripes have an area of 0.28 of that of the total filter, while the center stripe has an area of 0.44 of that of the total filter. In such a case, the final screen luminance would be $0.28*3*Y$ or $0.84*Y$. The reduction factor Y is the difference between the transmittance factor of two transmitting arrays, if used, and the reflectance factor of the reflecting array or the transmittance factor of a single transmitting array.

Projection system 1000 is described in the above embodiment as using a lenticular reflecting array 1030 that has cylindrical lenticules and a RGB three-striped filter 1070. In alternate embodiments, the lenticular reflecting chrominance array 1030 may instead be composed of spherical lenticules (such as spherical lenticules 610 of FIG. 6(*a*)). In one such alternate embodiment, the corresponding filter 1070 may instead be a four-segment RGB filter (such as filter 720 of FIG. 7(*b*)). The number of quadruplets for pseudo-chrominance is $(1/9)*N$, with the total number of pixels at $4*(1/9)*N+N=(13/9)*N$ or $1.44*N$. The final screen luminance of such a projection system is 0.75 (the fractional area of a single segment multiplied by 3) multiplied by the reduction factor Y. The reduction factor Y is the difference between the transmittance factor of two transmitting arrays, if used, and the reflectance factor of the reflecting array or the transmittance factor of a single transmitting array. As depicted, the final screen luminance would be $0.75*R$, which is the reflectance factor of the reflecting array.

In another such alternate embodiment, where the lenticular array 1030 uses spherical lenticules, the corresponding filter 1070 may instead be a four-segment RGBW filter (such as filter 730 of FIG. 7(*c*)). The extra luminance carried by the chrominance array (due to the extra white pure luminance in the filter) causes the number of quadruplets of pixels for pseudo-chrominance to be $(1/4)*N$. Thus the total number of pixels is $4*(1/4)*N$ plus N for a total of $2*N$. The final screen luminance is a total of 1.0 multiplied by the reduction factor Y. The reduction factor Y is the difference between the transmittance factor of two transmitting arrays, if used, and the reflectance factor of the reflecting array or the transmittance factor of a single transmitting array.

Figure 11:
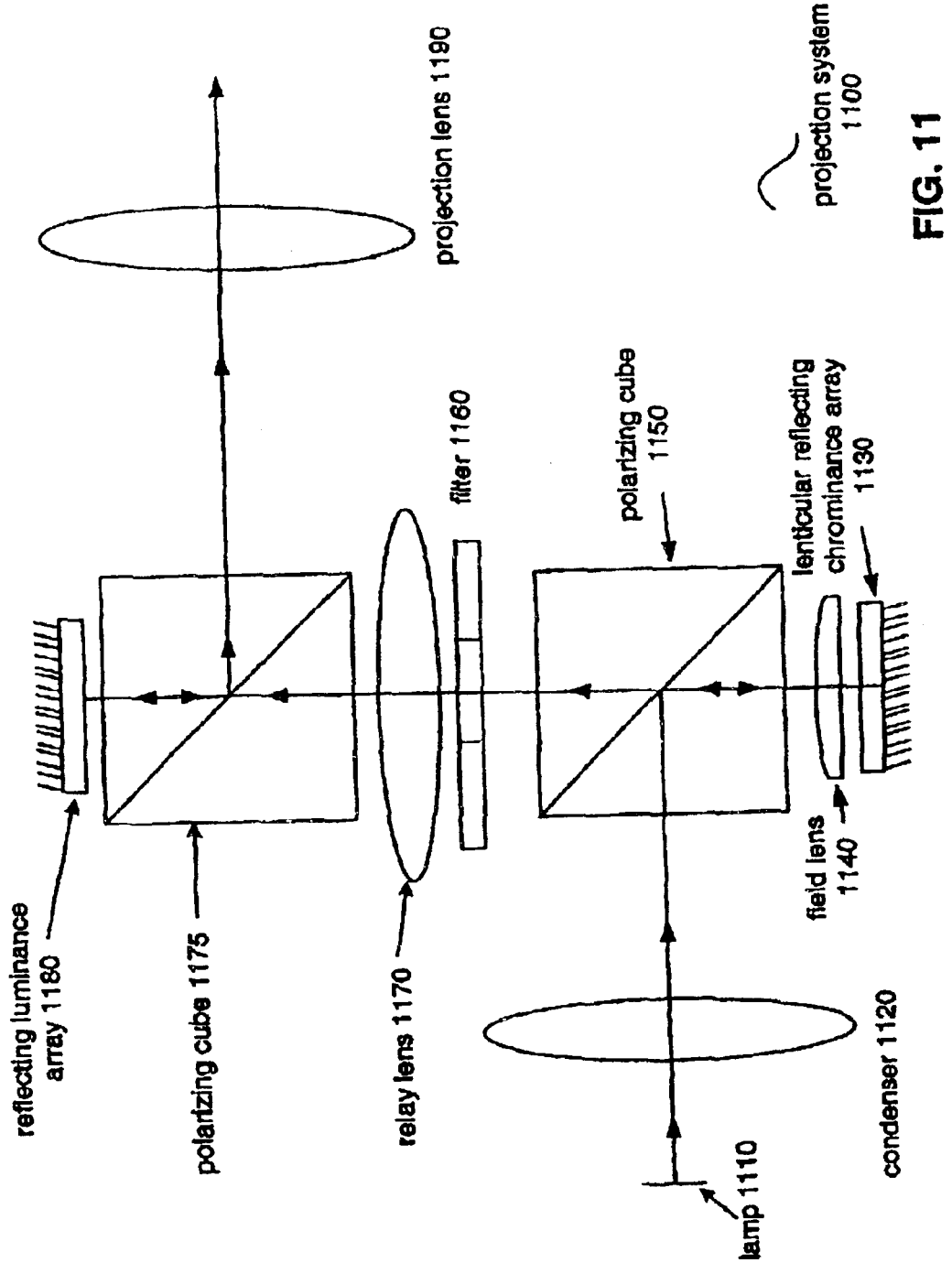
FIG. 11 illustrates a cylindrical Red, Green and Blue lenticular projection system with a reflecting chrominance array and reflecting luminance array.

FIG. 11 illustrates a lenticular projection system with a reflecting chrominance array and reflecting luminance array. The display of projection system 1100 is initiated by a lamp 1110 which is typically a spherical light source. The light supplied by lamp 1110 is shone into an condenser 1120. Condenser 1120 causes the light from lamp 1110 to become spatially uniform. These rays are first passed through a first polarizing cube 1150 which allows any light arriving in a given direction X to pass through its hypotenuse while reflecting back any light perpendicular to that direction X.

On a lenticular reflecting chrominance array 1130, the chrominance signal is used to produce, in each group of three pixels underneath a cylindrical lenticule, the levels required to generate an image. Correspondingly, a filter 1160 is placed proximate to a relay lens 1170. Filter 1160 is similar to filter 710 of FIG. 7(*a*) in that it consists of three stripes, one Red, one Green and one Blue, matching the pattern of pixels in lenticular array 1130. After passing through the red, green, and blue stripes of filter 1160 on the relay lens 1170, these signal levels display the chrominance features of the picture at constant luminance.

The relay lens 1170 images the reflecting chrominance array 1130 on to a reflecting luminance array 1180. The relay lens 1170 also places thereby the modulated chrominance component of the image into the second polarizing cube 1175. The use of relay lens 1170 in the optical path prior to the main projection lens 1190 results in some loss of definition and increase in flare. It also introduces the need for registration of the image produced by the relay lens 1170 on the second light-valve array 1180. However, the fact that only the low definition image passes through the relay lens 1170 greatly alleviates the importance of these factors. The relay lens 1170 makes it possible to reduce the size of the reflecting chrominance array 1130 and thus can reduce its cost. With, the number of chrominance pixels being (3/9)N (see below), for pixels of the same area in the chrominance array 1130, its total area can be reduced to one third.

The total number of pixels in projection system 1100 depends upon the number of RGB triplets of pixels that is required, since the lenticular array 1130 uses cylindrical lenticules, in this embodiment. The middle stripe of filter being red enables 57% (assuming all three filter stripes are of equal width, and a circular filter) more red light than in the case of the field sequential system. Hence the reduction in luminance would be only to about 47% instead of to about 30%, if the luminance was equal to the maximum attainable at the chromaticity of the red phosphor. If a pseudo-chrominance signal is used that had the maximum attainable luminance at all chromaticities, there would again be no reduction in luminance, and there would be less luminance to be carried by the pseudo-chrominance signal at all chromaticities involving the red light. This may ensure that the increase in the number of pseudo-chrominance triplets need only be to one for every nine "pseudo-luminance" (carrying only part luminance) pixels. Thus, the total number of pixels would be equal to $3*(1/9)*N+N=1.33*N$.

To decrease the total number of pixels in the above methods, the pseudo-chrominance and pseudo-luminance may be replaced instead by a pure chrominance and pure luminance signals. It is then possible, as has been shown in the art, to use one sixteenth as many triplets of chrominance pixels as luminance pixels. The number of pixels required is then N for the luminance display, and $(3/16)*N$ for chrominance, making a total of $(19/16)*N$. Compared to projection system 1100 using pseudo-chrominance, this has the advantage that the number of pixels is only $(19/16)*N=1.19*N$ instead of $1.33*N$. A disadvantage is that the chrominance display will absorb some of the light. The differences in this regard are described below in the section entitled "Transmittance of chrominance and pseudo-chrominance" displays.

The final screen luminance of system 1100 has a value reduced by any reduction in luminance caused by the pseudo-chrominance display (if used) and the absorption in the additional reflecting luminance array 1180. Alternatively, the final screen luminance may be reduced by the difference between the transmittance factor of two transmitting arrays, if used, and the reflectance factor of the reflecting array 1130 or the transmittance factor of a single transmitting array. As described, the final screen luminance of the projection system 1100 could be expressed as $A*3*Y$, where A is the ratio of the area of the shortest stripe of the filter of the projection to the total filter area, and a reduction factor. For instance, if the filter 710 of FIG. 7(a) is used, and if the widths of three stripes are equal, then the top and bottom stripes have an area of 0.28 of that of the total filter, while the center stripe has an area of 0.44 of that of the total filter. In such a case, the final screen luminance would be $0.28*3*R$ or $0.84*R$. The reduction factor R is the reflectance factor of the reflecting array since only reflecting arrays are used.

Projection system 1100 is described in the above embodiment as using a lenticular reflecting array 1130 that has cylindrical lenticules and using a RGB three-striped filter 1160. In alternate embodiments, the lenticular reflecting chrominance array 1130 may instead be composed of spherical lenticules (such as spherical lenticules 610 of FIG. 6(a)). In one such alternate embodiment, the corresponding filter 1160 may instead be a four-segment RGB filter (such as filter 720 of FIG. 7(b)). The number of quadruplets for pseudo-chrominance is $(1/9)*N$, with the total number of pixels at $4*(1/9)*N+N=(13/9)*N$ or $1.44*N$. The final screen luminance of such a projection system is 0.75 (the fractional area of a single segment multiplied by 3) multiplied by the reflectance factor of the reflecting array since only reflecting arrays are used.

In another such alternate embodiment where the lenticular array 1130 uses spherical lenticules, the corresponding filter 1160 may instead be a four-segment RGBW filter (such as filter 730 of FIG. 7(c)). The extra luminance carried by the chrominance array (due to the extra white pure luminance in the filter) causes the number of quadruplets of pixels for pseudo-chrominance to be $(1/4)*N$. Thus the total number of pixels is $4*(1/4)*N$ plus N for a total of $2*N$. The final screen luminance is a total of 1.0 multiplied by the reflectance factor of the reflecting array since only reflecting arrays are used.

Figure 12:
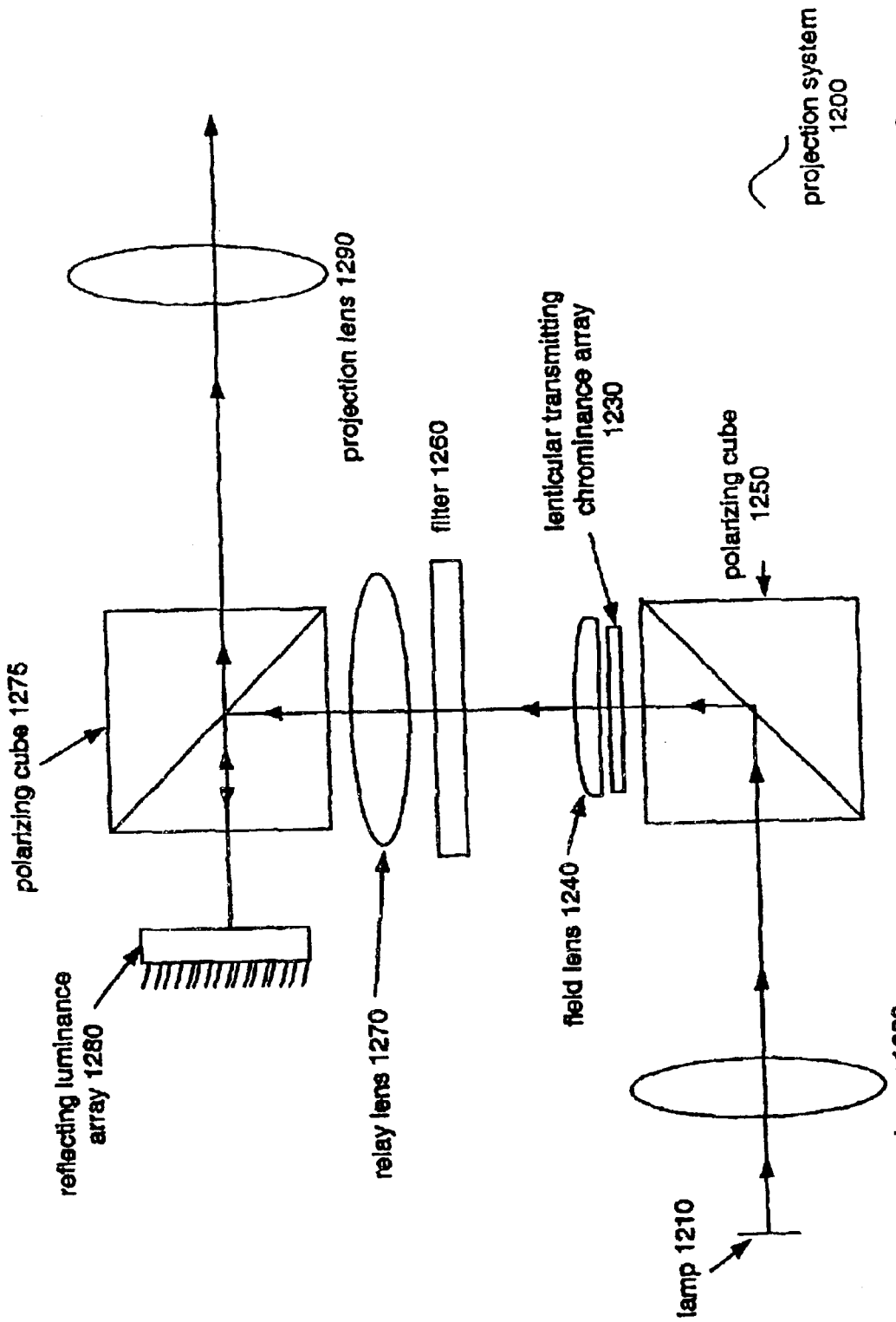
FIG. 12 illustrates a cylindrical Red, Green and Blue lenticular projection system with a transmitting chrominance array and reflecting luminance array.

FIG. 12 illustrates a lenticular projection system with a transmitting chrominance array and reflecting luminance array. The display of projection system 1200 is initiated by a lamp 1210 which is typically a spherical light source. The light supplied by lamp 1210 is shone into an condenser 1220. Condenser 1220 causes the light from lamp 1210 to become spatially uniform. These rays are first passed through a first polarizing cube 1250 which allows any light arriving in a given direction X to pass through its hypotenuse while reflecting back any light perpendicular to that direction X. The purpose of polarizing cube 1250 is to polarize light rays if the transmitting chrominance array 1230 is an LCD array.

On a lenticular transmitting chrominance array 1230, the chrominance signal is used to produce, in each group of three pixels underneath a cylindrical lenticule, the levels required to generate a chrominance image. Correspondingly, a filter 1260 is placed proximate to a relay lens 1270. Filter 1260 is similar to filter 710 of FIG. 7(a) in that it consists of three stripes, one Red, one Green and one Blue, matching the pattern of pixels in lenticular array 1230. After passing through the red, green, and blue stripes of filter 1260 on the relay lens 1270, these signal levels result in the chrominance features of the picture being displayed at constant luminance. The relay lens 1270 images the transmitting chrominance array 1230 on to a reflecting luminance array 1280. The use of relay lens 1270 in the optical path prior to the main projection lens 1290 results in some loss of definition and increase in flare. It also introduces the need for registration of the image produced by the relay lens 1270 on the second light-valve array 1280. Polarizing cube 1275 allows any light arriving in a given direction X to pass through its hypotenuse while reflecting back any light perpendicular to that direction X. The purpose of polarizing cube 1275 is to combine the luminance and chrominance components of the image, and to allow the reflecting luminance array 1280 to modulate the input chrominance image. However, the fact that only the low definition image passes through the relay lens 1270 greatly alleviates the importance of these factors. The relay lens 1270 makes it possible to reduce the size of the reflecting chrominance array 1130 and thus can reduce its cost. With the number of chrominance pixels being (3/9)N (see below), for pixels of the same area in the chrominance array 1230, its total area can be reduced to one third.

The total number of pixels in projection system 1200 depends upon the number of RGB triplets of pixels that is required, since the lenticular array 1230 uses cylindrical lenticules, in this embodiment. The middle stripe of filter being red enables 57% (assuming all three filter stripes are of equal width, and a circular filter) more red light than in the case of the field sequential system. Hence the reduction in luminance would be only to about 47% instead of to about 30%, if the luminance was equal to the maximum attainable at the chromaticity of the red phosphor. If a pseudo-chrominance signal is used that had the maximum attainable luminance at all chromaticities, there would again be no reduction in luminance, and there would be less luminance to be carried by the pseudo-chrominance signal at all chromaticities involving the red light. This may ensure that the increase in the number of pseudo-chrominance triplets need only be to one for every nine "pseudo-luminance" (carrying only part luminance) pixels. Thus, the total number of pixels would be equal to $3*(1/9)*N+N=1.33*N$.

To decrease the total number of pixels in the above methods, the pseudo-chrominance and pseudo-luminance may be replaced instead by a pure chrominance and pure luminance signals. It is then possible, as has been shown in the art, to use one sixteenth as many triplets of chrominance pixels as luminance pixels. The number of pixels required is then N for the luminance display, and $(3/16)*N$ for chrominance, making a total of $(19/16)*N$. Compared to projection system 1200 using pseudo-chrominance, this has the advantage that the number of pixels is only $(19/16)*N=1.19*N$ instead of $1.33*N$. A disadvantage is that the chrominance display will absorb some of the light. The differences in this regard are described below in the section entitled "Transmittance of chrominance and pseudo-chrominance" displays.

The final screen luminance of system 1200 has a value reduced by any reduction in luminance caused by the pseudo-chrominance display (if used) and the absorption in the additional transmitting luminance array 1240. Alternatively, the final screen luminance may be reduced by the difference between the transmittance factor of two transmitting arrays, if used, and the reflectance factor of the reflecting array 1230 or the transmittance factor of a single transmitting array. As described, the final screen luminance of the projection system 1200 could be expressed as $A*3*T$, where A is the ratio of the area of the shortest stripe of the filter of the projection to the total filter area, and a reduction factor T. For instance, if the filter 710 of FIG. 7(a) is used, and if the widths of three stripes are equal, then the top and bottom stripes have an area of 0.28 of that of the total filter, while the center stripe has an area of 0.44 of that of the total filter. In such a case, the final screen luminance would be $0.28*3*T$ or $0.84*T$. The reduction factor T is the transmittance factor of the transmitting array 1230.

Projection system 1200 is described in the above embodiment as using a lenticular transmitting array 1230 that has cylindrical lenticules and using a RGB three-striped filter 1260. In alternate embodiments, the lenticular transmitting chrominance array 1230 may instead be composed of spherical lenticules (such as spherical lenticules 610 of FIG. 6(a)). In one such alternate embodiment, the corresponding filter 1160 may instead be a four-segment RGB filter (such as filter 720 of FIG. 7(b)). The number of quadruplets for pseudo-chrominance is $(1/9)*N$, with the total number of pixels at $4*(1/9)*N+N=(13/9)*N$ or $1.44*N$. The final screen luminance of such a projection system is 0.75 (the fractional area of a single segment multiplied by 3) multiplied by the transmittance factor T of the transmitting array 1230.

In another such alternate embodiment where the lenticular array 1230 uses spherical lenticules, the corresponding filter array 1260 may instead be a four-segment RGBW filter (such as filter 730 of FIG. 7(c)). The extra luminance carried by the chrominance array (due to the extra white pure luminance in the filter) causes the number of quadruplets of pixels for pseudo-chrominance to be $(1/4)*N$. Thus the total number of pixels is $4*(1/4)*N$ plus N for a total of $2*N$. The final screen luminance is a total of 1.0 multiplied by T, the transmittance factor of the transmitting array 1230.

Transmittance of Chrominance Versus Pseudo-chrominance

A true chrominance display has constant luminance, and this would have to be produced by the triplets of pixels (in the cylindrical lenticular methods) or by the quadruplets of pixels (in the spherical lenticular methods). For the luminance to be constant for all groups of pixels, it would have to be constant for all chromaticities within the display gamut. This implies that the luminance level would have to be that of the chromaticity whose maximum luminance is the lowest.

In the cylindrical lenticular methods, the luminance of the blue primary is always the lowest, and is lower than that of the display white by a large factor, typically representing a reduction to about 10%. This would imply that the luminance-chrominance displays would be only one tenth of the luminance of the RGB lenticular display system 800 of FIG. 8. However, it is known in the field of broadcast television that considerable savings in bandwidth can be made even when, because of the effects of gamma correction, some of the luminance is carried by the chrominance signals (referred to as pseudo-chrominance signals). If a pseudo-chrominance signal was used in which the luminance was equal to the maximum attainable at the chromaticity of the red phosphor where possible, and elsewhere was the maximum attainable, the reduction in luminance would only be to about 30%. This would result in chromaticities near those of the blue phosphor having part of their luminance displayed by the low-definition pseudo-chrominance display. But, since the human eye has poor resolution of blue light, any reduction in picture definition would be negligibly small.

If a pseudo-chrominance signal were used in which the luminance was equal to the maximum attainable at the chromaticity of the green phosphor where possible, and elsewhere was the maximum attainable, the reduction in luminance would only be to about 60%. This would result in chromaticities near those of the blue and red phosphors having part of their luminance displayed by the low-definition display. Again since the eye has poorer resolution of red light than of white light, any reduction in picture definition would not be large.

Finally, if a pseudo-chrominance signal were used in which the luminance was equal to the maximum attainable at all chromaticities, there would be no reduction in luminance. This would result in all chromaticities other than those of the display white having part of their luminance displayed by the low-definition display. Again since the eye has poorer resolution of colored light than of white light, the reduction in picture definition would be limited. The reduction could be ameliorated by increasing the number of triplets for pseudo-chrominance from one for every sixteen pseudo-luminance pixels to one for every four, for instance, making a total number of pixels equal to $(3/4+4/4)N=(7/4)N$.

The pixel count can be further modified by choosing the center stripe on the projection lens to be used for the red filter. On a circular lens this results in there being about 57% more red light than in the case of the field sequential system. Hence the reduction in luminance would be only to about 47% instead of to about 30%, if the luminance was equal to the maximum attainable at the chromaticity of the red phosphor. If the pseudo-chrominance signal had the maximum attainable luminance at all chromaticities, there would again be no reduction in luminance. In fact, there would be less luminance to be carried by the pseudo-chrominance signal at all chromaticities involving the red light. This might ensure that the increase in the number of pseudo-chrominance triplets need only be to one for every nine pseudo-luminance pixels making a total number of pixels equal to $(3/9+9/9)*N=1.33*N$, which is described in the embodiments above.

In spherical lenticular systems, using four colored elements, the luminance of the blue primary is also always the lowest and lower than that of the display white by a large factor. If two of the elements were red and a pseudo-chrominance signal were used in which the luminance was equal to the maximum attainable at the chromaticity of the two red elements (phosphors), and elsewhere was the maximum attainable, the reduction in luminance would only be to about 60%. Again, this would result in chromaticities near those of the blue phosphor having part of the their luminance displayed by the low definition display with the poor blue resolution by the human eye resulting in only negligibly small effects. If a pseudo-chrominance signal had the maximum at all chromaticities, there would again be no reduction in luminance. This would again result in all chromaticities other than those of the display white having part of their luminance displayed by the low-definition display. However, compared to the cylindrical lenticular methods, the effects would be reduced by the double area of red. Also, the poorer resolution of the eye to colored light than to white light will again reduce the apparent effects. If these effects were not negligible, they could again be allowed for by increasing the number of pseudo-chrominance quadruplets from one for every sixteen luminance pixels to one for every nine, making a total number of pixels equal to $(4/9+9/9)*N=(13/9)*N$, that is $1.44*N$.

In the spherical lenticular methods using red, green, blue, and colorless segments in the filter, the luminance of the blue primary will be lower than that of the display white by an even larger factor. The number of pseudo-chrominance groups then has to be increased to one for every four pseudo-luminance pixels, making a total number of pixels of $(4/4+1)*N$, or $2*N$.

Using Mosaics or Prism Assemblies

Instead of cylindrical lenticular chrominance systems, mosaics of red, green, and blue areas can be used. In the case of the spherical lenticular chrominance systems, mosaics of a red area, a green area, a blue area, and a red or green or blue area can be used, or mosaics of a red area, a green area, a blue area, and a colorless area can be used. The advantage of using mosaics instead of lenticular systems is that the complications of the lenticular optics are avoided. One disadvantage is that, because filters in mosaics have to be made of dyes rather than of the dichroic materials which can be used in lenticular systems, the displays have luminances reduced to about 30%.

Instead of the lenticular chrominance arrays in systems shown in systems 1000 and 1100, a dichroic prism assembly with three lightvalve arrays can be used. The loss of light caused by the filter wheel in the field sequential system or by the filter arrays in the mosaic and lenticular systems, is avoided in the prism assembly by the superimposition of the three images optically using dichroic reflectors. This gain in efficiency, potentially by a factor of three, makes it possible to use a pseudo-chrominance signal the luminance of which is only one third of that of the white. This still achieves a system in which the luminance of the white is not reduced relative to that of the field sequential system (except for absorptions in the prism assembly and in the second lightvalve arrays). The reduction of the chrominance display to one-third of that of the white means that luminance is carried by it only for bluish colors to which the eye is not very sensitive. The number of pixels in the three chrominance arrays need therefore be only one sixteenth of those in the luminance array, making a total number of pixels of $(3/16+1)*N=(19/16)*N=1.19N$. The small number of pixels required in each of the chrominance arrays means that, for the same size of pixel, these arrays need be only one sixteenth of the area of the luminance array thus lowering their cost dramatically. The prism assembly can also be greatly reduced in size, again lowering cost. The need for exact registration of the three chrominance arrays is also alleviated by their being only used for the low-definition chrominance display.

| COMPARISON TABLE OF ALL PROJECTION SYSTEMS | | | | | | |
|---|---|---|---|---|---|---|
| Projection system | Lenticule/ System | Filters | Chromin. Array/ Lumin. Array | Pixel Shape | Pixels | White Lum. |
|  | Field Seq. | RGB | Refl. |  |  | 1 |
|  | Prism Ass. | RGB | Refl. |  | 3N | 3P |
| 100 (3 lamps) | Triple Proj. | RGB | Trans. or Refl. |  | 3N | 3 |
| 200 (1 lamp) | Triple Proj. | RGB | Trans. or Refl. |  | 3N | 1 |
| 400 | Mosaic | RGB | Refl. | Square | 3N | 0.30 |
| 800 | Cyl. | RGB | Trans. or Refl. | Rectangular | 3N | 0.84X |
| 900 | Sph. | RGBR | Trans. or Refl. | Square | 4N | 0.75X |
| 900 (filter 730) | Sph | RGBW | Trans. or Refl. | Square | 4N | 1.00X |
| 1000 | Cyl. | RGB | Rfl or Tr/Trans | Rectangular | 1.33N | 0.84Y |
| 1000 (filter 720) | Sph. | RGBR | Rfl or Tr/Trans. | Square | 1.44N | 0.75Y |
| 1000 (filter 730) | Sph. | RGBW | Rfl or Tr/Trans. | Square | 2.00N | 1.00Y |
| 1100 | Cyl. | RGB | Refl./Refl. | Rectangular | 1.33N | 0.84R |
| 1100 (filter 720) | Sph. | RGBR | Refl./Refl. | Square | 1.44N | 0.75R |
| 1100 (filter 730) | Sph. | RGBW | Refl./Refl. | Square | 2.00N | 1.00R |
| 1200 | Cyl. | RGB | Trans./Refl. | Rectangular | 1.33N | 0.84T |

-continued

COMPARISON TABLE OF ALL PROJECTION SYSTEMS

| Projection system | Lenticule/ System | Filters | Chromin. Array/ Lumin. Array | Pixel Shape | Pixels | White Lum. |
|---|---|---|---|---|---|---|
| 1200 (filter 720) | Sph. | RGBR | Trans./Refl. | Square | 1.44N | 0.75T |
| 1200 (filter 730) | Sph. | RGBW | Trans./Refl. | Square | 2.00N | 1.00T |
| (no lent.) | Mosaic | RGB | | Square | 1.33N | 0.25T |
| (no lent.) | Mosaic | RGBR | | Square | 1.44N | 0.22T |
| (no lent.) | Mosaic | RGBW | | Square | 2.00N | 0.30T |
| (no lent.) | Prism ass | RGB | Ref./Trans. | Squane | 1.19N | 1.00PT |
| (no lent.) | Prism ass. | RGB | Refl./Ref. | Square | 1.19N | 1.00PR |

In the above table, P is the transmittance factor of prism assembly, T is transmittance factor of transmitting array, R the reflectance factor of reflecting array, and X, the difference between transmittance factor of transmitting array, if used, and reflectance factor of reflecting array. Y is the difference between transmittance factor of two transmitting arrays, if used, and reflectance factor of reflecting array, or T if only one transmitting array is used.

The invention, as described above, refers to "lightvalves" as the light modulation device. However, it will be appreciated by one of ordinary skill in the art, that the principles presented herein can be applied to any type of light modulation device, such as a liquid crystal device or a micromirror device. Additionally, while the invention refers to the initial light source as an incandescent lamp, the initial light source may be any kind of illuminant, such an incandescent lamp, a mercury halogen lamp, an array of lasers or powerful LEDs (Light Emitting Diodes).

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A system for optical projection of a complete image, using a lightvalve, said system comprising:
   a lenticular array composed of lenticules positioned onto said lightvalve; and
   a filter placed about a projection lens, said filter aligned with the pixels of said lenticular array, said filter depending upon the shape of said lenticules in said lenticular array, wherein said filter and projection lens are arranged such that color components separately output by said filter for one of said pixels are combined and focused onto a location, and wherein said filter is composed of at least four segments.

2. A system according to claim 1 wherein said lenticules are cylindrical in shape.

3. A system according to claim 2 wherein pixels of said system are caused to be rectangular in shape by the shape of said lenticules.

4. A system according to claim 2 wherein a first segment of said filter carries Blue signals, a second segment of said filter carries Red signals and a third segment of said filter carries Green signals, said segments aligned to match the pattern of pixels of said lenticular array.

5. A system according to claim 1 wherein said lenticules are spherical in shape.

6. A system according to claim 5, wherein pixels of said system are caused to be square in shape by the shape of said lenticules.

7. A system according to claim 1 wherein said first segment carries Blue signals, said second segment carries Red signals, said third segment carries Green signal, and said fourth segment carries one of Red, Green, or Blue signals.

8. A system according to claim 1 wherein said first segment carries signals of a first color component, wherein said second segment carries signals of a second color component, wherein said third segment carries signals of a third color component, wherein said fourth segment carries signals of said first color component, and wherein said second segment separates said first and fourth segments.

9. A system according to claim 1 wherein said first segment carries signals of a first color component, said second segment carries signals of a second color component, said third segment carries signals of a third color component, and said fourth segment carries White signals.

10. A system for optical projection of a complete image, using a lightvalve, said system comprising:
    a lenticular array composed of lenticules positioned onto said lightvalve; and
    a filter placed about a projection lens, said filter aligned with the pixels of said lenticular array, said filter depending upon the shape of said lenticules in said lenticular array, wherein said filter is composed of a first, second and third segments, said first segment carrying signals of a first color component, said second segment carrying signals of a second color component, and said third segment carrying Red signals, wherein said first and second segments are equal in area and wherein said third segment is larger in area than said first or second segments.

11. A system according to claim 10 further comprising:
    a lamp which acts as initial source of light for said system;
    a condenser placed between said lamp and said lightvalve causing light from said lamp to become spatially uniform and directed onto said lightvalve and said lenticular array, said lenticular array being one of a transmitting type or a reflecting type; and
    a field lens placed between said lightvalve and said filter, said field lens focusing the output of said lightvalve and said lenticular array onto the appropriate region of said filter, further wherein said projection lens is place at the output of said filter, said projection lens focusing said filtered light onto the output medium displaying said complete image.

12. A system for optical projection of a complete image, using a first and second lightvalves, said system comprising:
    a lenticular array composed of lenticules positioned to receive light from said first and second lightvalves; and
    a filter placed about a projection lens, said filter aligned with the pixels of said lenticular array, further wherein said system functions to separate chrominance and luminance components of said complete image into separate images.

13. A system according to claim 12, wherein said lenticules are cylindrical in shape.

14. A system according to claim 13 wherein pixels of said system are caused to be rectangular in shape by the shape of said lenticules.

15. A system according to claim 13 wherein said filter is composed of a first, second and third segments, said first segment carrying Blue signals, said second segment carrying Red signals and said third segment carrying Green signals, said stripes aligned to match the pattern of pixels of said lenticular array.

16. A system according to claim 15 wherein said first and third segment are equal in area and where said second segment is larger in area than said first or third segments.

17. A system according to claim 12 wherein said lenticules are spherical in shape.

18. A system according to claim 17 wherein pixels of said system are caused to be square in shape by the shape of said lenticules.

19. A system according to claim 12 wherein said filter depends upon the shape of said lenticules in said lenticular array.

20. A system according to claim 19 wherein said lenticules are built onto said first lightvalve.

21. A system according to claim 12 wherein said separate images comprise a chrominance image and a luminance image, and wherein said system functions to modulate said chrominance image with said luminance image.

22. A system for optical projection of a complete image, using a first and second lightvalves, said system comprising:
a lenticular array composed of lenticules positioned to receive light from said first and second lightvalves; and
a filter placed about a relay lens, said filter aligned with the pixels of said lenticular array, further wherein said system functions to process chrominance and luminance components of said complete image into separate images.

23. A system according to claim 22 wherein said lenticules are cylindrical in shape.

24. A system according to claim 23 wherein pixels of said system are caused to be rectangular in shape by the shape of said lenticules.

25. A system according to claim 23 wherein said filter is composed of a first, second and third segments, said first segment carrying Blue signals, said second segment carrying Red signals and said third segment carrying Green Signals, said stripes aligned to match the pattern of pixels of said lenticular array.

26. A system according to claim 25 wherein said first and third segments are equal in area and where said second segment is larger in area than said first or third segments.

27. A system according to claim 22 wherein pixels of said system are caused to be square in shape by the shape of said lenticules.

28. A system according to claim 27 wherein pixels of said system are caused to be square in shape by the shape of said lenticules.

29. A system according to claim 22 wherein said separate images comprise a chrominance image and a luminance image, and wherein said system functions to modulate said chrominance image with said luminance image.

30. An optical projection system, said system comprising:
a lenticular array having lenticules positioned to receive light from lightvalves; and
a filter placed about a projection lens, said filter aligned with the pixels of said lenticular array, said filter having at least four segments, a first segment of said filter carrying a first color component, a second segment of said filter carrying a second color component, and a third segment of said filter carrying a third color component, wherein said filter and projection lens are arranged such that each of said color components are combined and focused onto a location.

31. A system according to claim 30 wherein said filter depends upon the shape of said lenticules in said lenticular array.

32. A system according to claim 30 wherein said system functions to separate chrominance and luminance components of an image into separate images.

33. A system according to claim 30 wherein said fourth segment carries one of said color components.

34. A system according to claim 30 wherein said fourth segment carries White signals.

35. An optical projection method, comprising:
transmitting light from lightvalves through a lenticular array,
transmitting said light from said lenticular array through at least four segments of a filter, said filter aligned with the pixels of said lenticular array;
outputting a first color component of said light from a first segment of said filter;
outputting a second color component of said light from a second segment of said filter;
outputting a third color component of said light from a third segment of said filter; and
combining and focusing each of said color components onto a location.

36. A method according to claim 35 further comprising separately modulating chrominance and luminance components of an image defined by said light transmitted from said light valves.

37. A system according to claim 35 further comprising outputting said first color component from a fourth segment of said filter.

38. A system according to claim 35 wherein said first and fourth segments are separated by said second segment.

39. A system according to claim 35 further comprising outputting white signals from a fourth segment of said filter.

40. An optical projection method, comprising:
transmitting light from lightvalves through a lenticular array;
filtering said light transmitted from said lightvalves; and
separately modulating chrominance and luminance components of said light.

41. A method according to claim 40 further comprising:
separately outputting, from a filter aligned with the pixels of said lenticular array, different color components of one of said pixels; and
combining and focusing each of said color components for said one pixel onto a location.

42. A method according to claim 41 wherein said filter has a plurality of segments and wherein said filtering comprises filtering a different color component via each of said segments.

* * * * *